(12) United States Patent
Shinoda et al.

(10) Patent No.: US 11,598,221 B1
(45) Date of Patent: Mar. 7, 2023

(54) TURBO FLUID MACHINE

(71) Applicant: KABUSHIKI KAISHA TOYOTA JIDOSHOKKI, Aichi (JP)

(72) Inventors: Fumiya Shinoda, Aichi (JP); Fumihiro Suzuki, Aichi (JP); Ryo Umeyama, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 17/900,605

(22) Filed: Aug. 31, 2022

(30) Foreign Application Priority Data

Oct. 6, 2021 (JP) .............................. JP2021-164481

(51) Int. Cl.
| | | |
|---|---|---|
| F01D 25/16 | (2006.01) | |
| F01D 25/12 | (2006.01) | |
| F16C 17/02 | (2006.01) | |
| H01M 8/04111 | (2016.01) | |

(52) U.S. Cl.
CPC ......... *F01D 25/125* (2013.01); *F01D 25/162* (2013.01); *F01D 25/166* (2013.01); *F16C 17/024* (2013.01); *F05D 2220/40* (2013.01); *F05D 2240/53* (2013.01); *F05D 2250/61* (2013.01); *F05D 2260/20* (2013.01); *H01M 8/04111* (2013.01)

(58) Field of Classification Search
CPC .... F01D 25/125; F01D 25/162; F01D 25/166; F16C 25/04; F16C 17/024
See application file for complete search history.

(56) References Cited

U.S. PATENT DOCUMENTS

| | | | | |
|---|---|---|---|---|
| 5,902,049 | A * | 5/1999 | Heshmat | F16C 27/02 |
| | | | | 384/106 |
| 6,350,059 | B1 | 2/2002 | Takahashi | |
| 7,056,025 | B2 * | 6/2006 | Nakata | F16C 17/024 |
| | | | | 384/106 |
| 9,004,765 | B1 * | 4/2015 | Lee | F16C 33/1015 |
| | | | | 384/103 |
| 10,415,634 | B2 | 9/2019 | Park et al. | |

(Continued)

FOREIGN PATENT DOCUMENTS

| | | |
|---|---|---|
| JP | H1122722 A | 1/1999 |
| JP | 2004190761 A | 7/2004 |

(Continued)

*Primary Examiner* — Eldon T Brockman
(74) *Attorney, Agent, or Firm* — Greenblum & Bernstein, P.L.C.

(57) ABSTRACT

A turbo fluid machine includes a rotary shaft configured to rotate in one rotational direction, and a radial foil bearing. The radial foil bearing includes: a bump foil formed of an elastic thin plate having a corrugated shape. The bump foil is divided into first and second foil portions located respectively on one side and on the other side in an axial direction of the rotary shaft. Ridges on the first foil portion are inclined in the other rotational direction of the rotary shaft while extending from an edge of the first foil portion adjacent to the other side toward the one side in the axial direction. The ridges on the second foil portion are inclined in the other rotational direction of the rotary shaft while extending from an edge of the second foil portion adjacent to the one side toward the other side in the axial direction.

4 Claims, 6 Drawing Sheets

(56) References Cited

U.S. PATENT DOCUMENTS

| | | | |
|---|---|---|---|
| 2007/0183697 A1* | 8/2007 | Lee | F16C 27/02 384/106 |
| 2011/0103725 A1* | 5/2011 | Omori | F16C 17/024 384/276 |
| 2014/0062024 A1* | 3/2014 | Bidkar | F01D 11/04 277/303 |
| 2015/0362012 A1* | 12/2015 | Ermilov | F16C 43/02 384/105 |
| 2018/0051745 A1* | 2/2018 | Himmelmann | F04D 29/057 |
| 2019/0063491 A1* | 2/2019 | Lee | F16C 33/1015 |

FOREIGN PATENT DOCUMENTS

| | | |
|---|---|---|
| JP | 2006057652 A | 3/2006 |
| JP | 2012251605 A | 12/2012 |
| JP | 6742349 B2 | 8/2020 |
| JP | 2000346056 A | 12/2020 |
| JP | 2021046913 A | 3/2021 |

* cited by examiner

TURBO FLUID MACHINE

CROSS-REFERENCE TO RELATED APPLICATION

This application claims priority to Japanese Patent Application No. 2021-164481 filed on Oct. 6, 2021, the entire disclosure of which is incorporated herein by reference.

The present disclosure relates to a turbo fluid machine.

BACKGROUND ART

Japanese Patent Application Publication No. 2012-251605 discloses a known turbo fluid machine. This turbo fluid machine includes a rotary shaft, an operating part configured to rotate together with the rotary shaft to compress and discharge a fluid, a housing for accommodating the rotary shaft and the operating part, and a radial foil bearing supporting the rotary shaft such that the rotary shaft is rotatable relative to the housing.

The radial foil bearing includes a top foil, a bump foil, and a bearing housing. The top foil is formed of an elastic thin plate having a bearing surface that faces a peripheral surface of the rotary shaft. The peripheral surface of the rotary shaft serves as a bearing-contact surface that faces the bearing surface of the top foil in a radial direction of the rotary shaft. The bump foil is formed of an elastic thin corrugated plate and elastically supports the back surface of the top foil. The bearing housing supports the back surface of the bump foil.

The top foil of the radial foil bearing supports the rotary shaft, which rotates relative to the housing at low speed rotation of the rotary shaft, with the top foil in contact with the rotary shaft. At high speed rotation of the rotary shaft, the rotary shaft is supported by a fluid film produced in a bearing gap between the bearing-contact surface and the bearing surface with the top foil not in contact with the rotary shaft.

However, the radial foil bearing of such a turbo fluid machine may cause the fluid compressed in the bearing gap to leak from the opposite ends of the bearing in the axial direction due to a pressure difference between the gap and its surroundings, thereby causing a decrease in a pressure of the fluid film, which leads to a decrease in a load capacity of the bearing.

In order to solve such a problem, for example, a herringbone groove may be formed in the bearing surface of the top foil or the bearing-contact surface of the rotary shaft such that the peak of the V-shape of the groove is oriented frontward in the rotational direction of the rotary shaft. This solution allows the fluid in the bearing gap to be guided by the herringbone groove toward the peak of the V-shape, in other words, toward the center of the bearing from the opposite ends of the bearing in the axial direction, thereby suppressing a leak of the fluid in the bearing gap from the ends of the bearing.

However, providing the herringbone groove of this solution causes a decrease in area of contact between the bearing surface and the bearing-contact surface at low speed rotation of the rotary shaft, thereby causing an increase in the contact surface pressure. This therefore may cause wear or burn-in on the top foil, which decreases the durability of the top foil.

The present invention, which has been made in light of the above-mentioned problem, is directed to providing a turbo fluid machine that is capable of suppressing a decrease in a pressure of a fluid film on a radial foil bearing so as to suppress a decrease in a load capacity of the radial foil bearing without causing a decrease in the durability of a top foil.

SUMMARY

In accordance with an aspect of the present disclosure, there is provided a turbo fluid machine that includes: a rotary shaft, an operating part, a housing, and a radial foil bearing. The rotary shaft is configured to rotate in one rotational direction about an axis of the rotary shaft. The operating part is configured to rotate together with the rotary shaft to compress and discharge a fluid. The housing accommodates the rotary shaft and the operating part. The radial foil bearing supporting the rotary shaft such that the rotary shaft is rotatable relative to the housing. The radial foil bearing includes: a top foil, a bump foil, and a bearing housing. The top foil is formed of an elastic thin plate and has a bearing surface that faces a peripheral surface of the rotary shaft. The bump foil is formed of an elastic thin plate having a corrugated shape in which ridges of projections projected toward the top foil are arranged in a circumferential direction of the rotary shaft, and the bump foil elastically supports the top foil. The bearing housing supports the bump foil. The bump foil is divided into a first foil portion and a second foil portion arranged respectively on one side and on the other side in an axial direction of the rotary shaft. The top foil is elastically supported by both of the first foil portion and the second foil portion. The ridges on the first foil portion are inclined in the other rotational direction of the rotary shaft while extending from an edge of the first foil portion adjacent to the other side toward the one side in the axial direction. The ridges on the second foil portion are inclined in the other rotational direction of the rotary shaft while extending from an edge of the second foil portion adjacent to the one side toward the other side in the axial direction.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DETAILED DESCRIPTION OF THE EMBODIMENTS

The following will describe an embodiment of the present disclosure in detail with reference to the accompanying drawings.

Embodiment

According to an embodiment, a turbo compressor 10 serves as a turbo fluid machine of this disclosure. The turbo compressor 10 is mounted on a fuel cell vehicle that includes a fuel cell system 1. The fuel cell system 1 supplies oxygen and hydrogen to a fuel cell mounted on the vehicle to generate electricity. The turbo compressor 10 compresses air containing oxygen to be supplied to the fuel cell.

Figure 1:
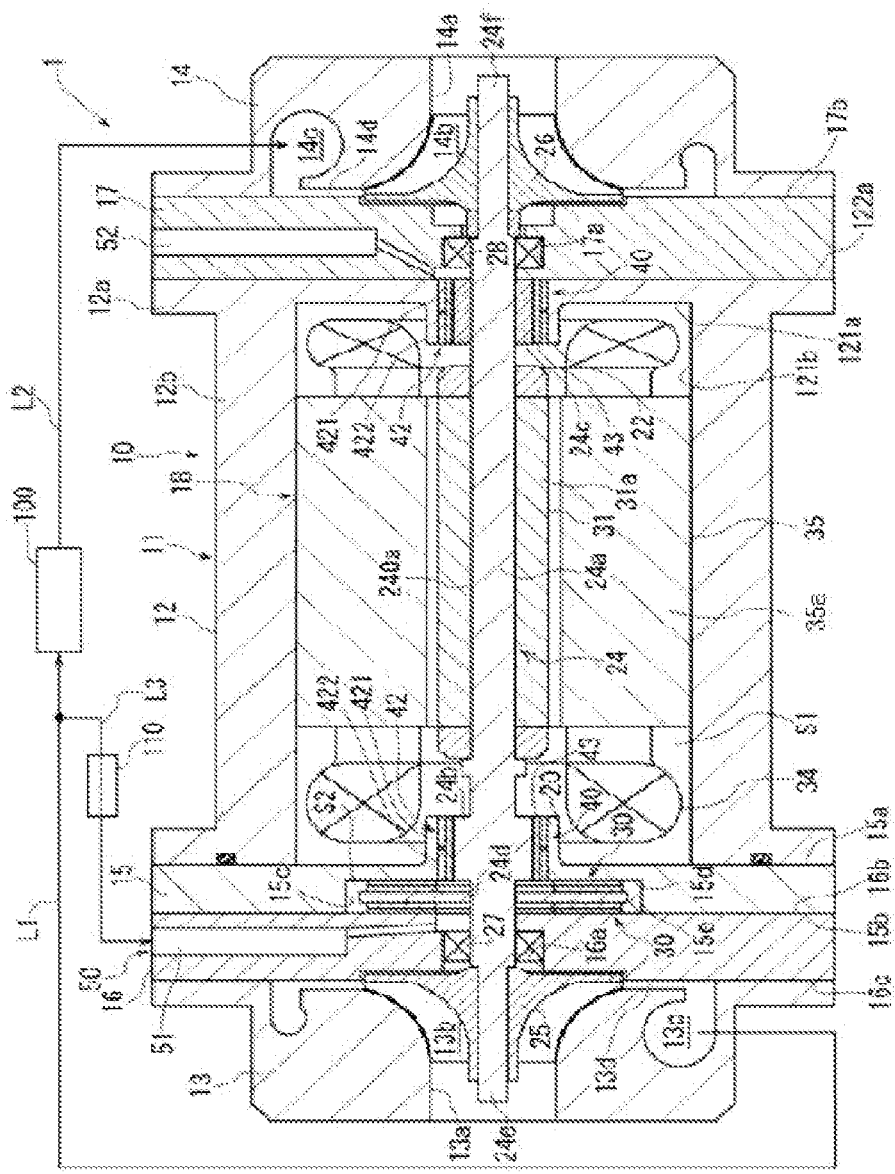
FIG. 1 is a sectional view of a turbo compressor according to an embodiment.

As illustrated in FIG. 1, the turbo compressor 10, which serves as the turbo fluid machine of the present disclosure, includes a housing 11. The housing 11 is made of metal, such as aluminum alloy. The housing 11 includes a motor housing 12, a compressor housing 13, a turbine housing 14, a first plate 15, a second plate 16, and a third plate 17.

The motor housing 12 includes a plate-like end wall 12a and a peripheral wall 12b. The peripheral wall 12b has a cylindrical shape and protrudes from an outer peripheral portion of the end wall 12a. The first plate 15 is connected to an open end of the peripheral wall 12b of the motor housing 12 to close an opening of the peripheral wall 12b.

In the motor housing 12, an inner surface 121a of the end wall 12a, an inner peripheral surface 121b of the peripheral wall 12b, and an end face 15a of the first plate 15 adjacent to the motor housing 12 cooperate to form a motor chamber S1. The motor chamber S1 accommodates an electric motor 18.

The first plate 15 has a first bearing holding portion 20. The first bearing holding portion 20 projects from the center portion of the end face 15a of the first plate 15 toward the electric motor 18. The first bearing holding portion 20 has a cylindrical shape.

The other end face 15b of the first plate 15 is distant from the motor housing 12, and has a recess 15c having a bottom surface 15d. The recess 15c has a circular hole shape. The cylindrical first bearing holding portion 20 is opened toward the bottom surface 15d of the recess 15c through the first plate 15. The recess 15c is formed coaxially with the first bearing holding portion 20. The recess 15c has an inner peripheral surface 15e through which the end face 15b is connected to the bottom surface 15d.

The motor housing 12 has a second bearing holding portion 22. The second bearing holding portion 22 projects from the center portion of the inner surface 121a of the end wall 12a of the motor housing 12 toward the electric motor 18. The second bearing holding portion 22 has a cylindrical shape. The cylindrical second bearing holding portion 22 is opened on an outer surface 122a of the end wall 12a through the end wall 12a of the motor housing 12. The first bearing holding portion 20 is formed coaxially with the second bearing holding portion 22.

Figure 2:
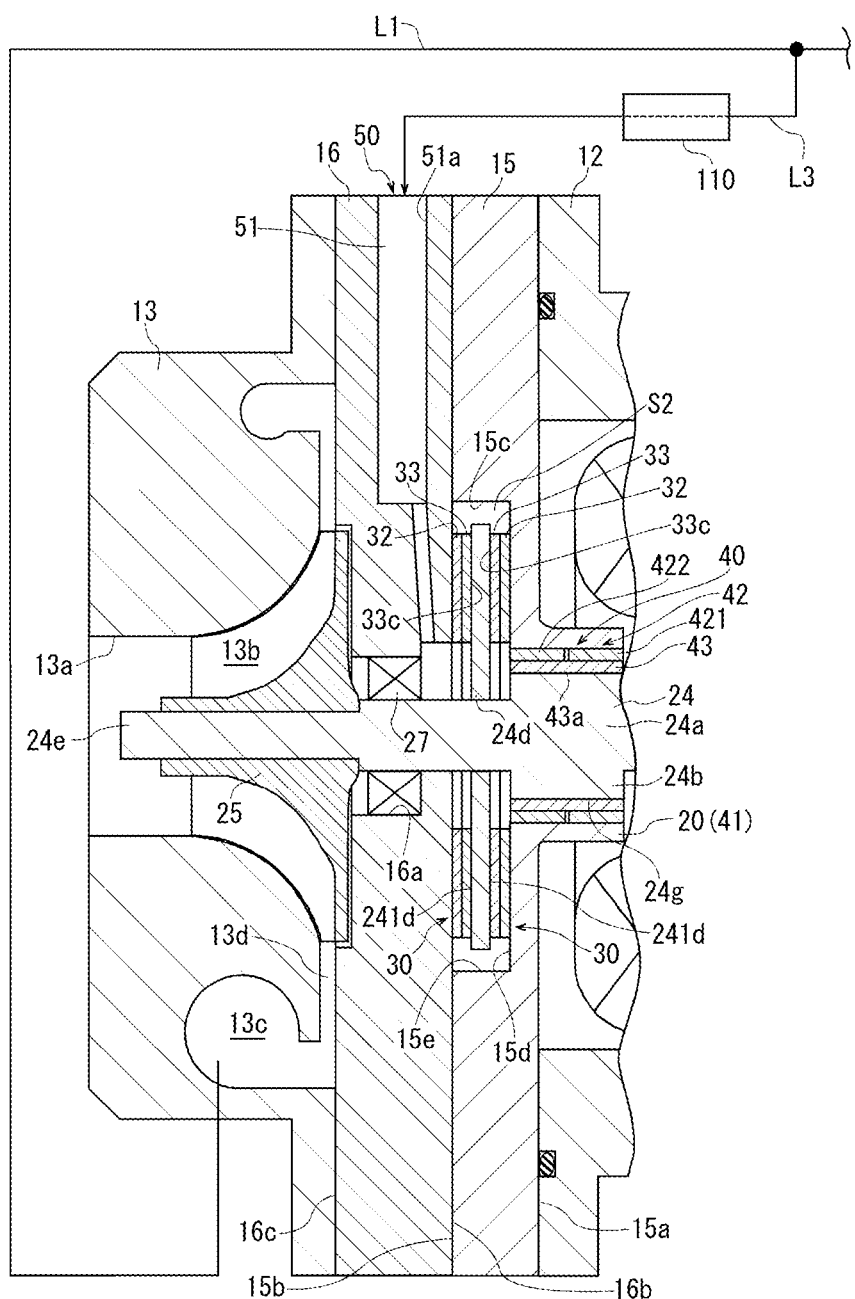
FIG. 2 is a fragmentary enlarged sectional view of the turbo compressor according to the embodiment.

As illustrated in FIG. 2, the second plate 16 is connected to the end face 15b of the first plate 15. The second plate 16 has a shaft insertion hole 16a at the center portion of the second plate 16. The shaft insertion hole 16a is communicated with the recess 15c. The shaft insertion hole 16a is formed coaxially with the recess 15c and the first bearing holding portion 20. The second plate 16 has an end face 16b that is located adjacent to the first plate 15, and the end face 16b cooperates with the recess 15c of the first plate 15 to define a thrust bearing accommodation chamber S2.

The compressor housing 13 has a cylindrical shape, and has a circular hole-shaped inlet 13a through which air is drawn into the compressor housing 13. The compressor housing 13 is connected to the other end face 16c of the second plate 16 that is distant from the first plate 15. The inlet 13a of the compressor housing 13 is formed coaxially with the shaft insertion hole 16a of the second plate 16 and the first bearing holding portion 20. The inlet 13a is opened on an end face of the compressor housing 13 that is distant from the second plate 16.

A first bladed wheel chamber 13b, a discharge chamber 13c, and a first diffuser passage 13d are formed between the compressor housing 13 and the end face 16c of the second plate 16. The first bladed wheel chamber 13b is communicated with the inlet 13a. The discharge chamber 13c extends about the axis of the inlet 13a around the first bladed wheel chamber 13b. The first bladed wheel chamber 13b is communicated with the discharge chamber 13c through the first diffuser passage 13d. The first bladed wheel chamber 13b is communicated with the shaft insertion hole 16a of the second plate 16.

Figure 3:
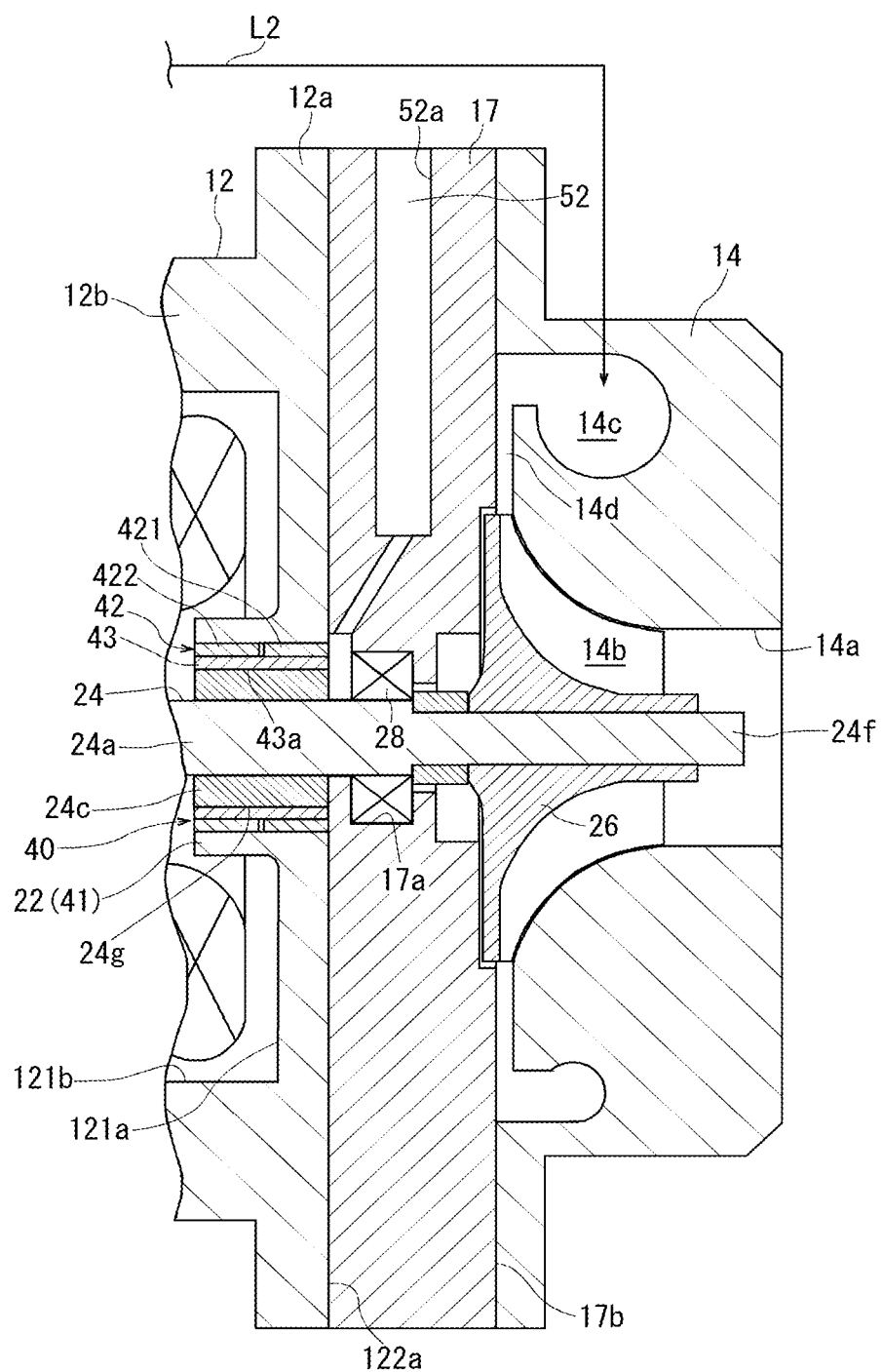
FIG. 3 is another fragmentary enlarged sectional view of the turbo compressor according to the embodiment.

As illustrated in FIG. 3, the third plate 17 is connected to the outer surface 122a of the end wall 12a of the motor housing 12. The third plate 17 has a shaft insertion hole 17a at the center portion of the third plate 17. The shaft insertion hole 17a is communicated with the second bearing holding portion 22. The shaft insertion hole 17a is formed coaxially with the second bearing holding portion 22.

The turbine housing 14 has a cylindrical shape, and has a circular hole-shaped outlet 14a through which air is discharged. The turbine housing 14 is connected to the other end face 17b of the third plate 17 that is distant from the motor housing 12. The outlet 14a of the turbine housing 14 is formed coaxially with the shaft insertion hole 17a of the third plate 17 and the second bearing holding portion 22. The outlet 14a is opened on an end face of the turbine housing 14 that is distant from the third plate 17.

A second bladed wheel chamber 14b, a suction chamber 14c, and a second diffuser passage 14d are formed between the turbine housing 14 and the end face 17b of the third plate 17. The second bladed wheel chamber 14b is communicated with the outlet 14a. The suction chamber 14c extends about the axis of the outlet 14a around the second bladed wheel chamber 14b. The second bladed wheel chamber 14b is communicated with the suction chamber 14c through the second diffuser passage 14d. The second bladed wheel chamber 14b is communicated with the shaft insertion hole 17a of the third plate 17.

As illustrated in FIG. 1, a rotating member 24 is accommodated in the housing 11. The rotating member 24 has a rotary shaft 24a as a shaft portion, a first supporting portion 24b, a second supporting portion 24c, and a third supporting portion 24d as a thrust collar. The rotary shaft 24a has a first end portion 24e as an end adjacent to the compressor housing 13 and a second end portion 24f as an end adjacent to the turbine housing 14. The first supporting portion 24b is formed in a part of an outer peripheral surface 240a of the rotary shaft 24a adjacent to the first end portion 24e, and disposed in the first bearing holding portion 20. The first supporting portion 24b is formed integrally with the rotary shaft 24a and projected from the outer peripheral surface 240a of the rotary shaft 24a so as to have a ring shape.

The second supporting portion 24c is formed in a part of the outer peripheral surface 240a of the rotary shaft 24a adjacent to the second end portion 24f, and disposed in the second bearing holding portion 22. The second supporting portion 24c has a cylindrical shape such that the second supporting portion 24c is projected from the outer peripheral surface 240a of the rotary shaft 24a so as to have a ring shape, and is fixed to the outer peripheral surface 240a of the rotary shaft 24a. The second supporting portion 24c is rotatable together with the rotary shaft 24a.

The third supporting portion 24d is disposed in the thrust bearing accommodation chamber S2. The third supporting portion 24d has a disc shape such that the third supporting portion 24d extends from the outer peripheral surface 240a of the rotary shaft 24a in the radial direction so as to have a ring shape, and is fixed to the outer peripheral surface 240a of the rotary shaft 24a. The third supporting portion 24d is rotatable together with the rotary shaft 24a. The third supporting portion 24d is disposed distant from the electric motor 18 in the axial direction of the rotary shaft 24a.

In the following description, directions, such as the axial direction, the circumferential direction, and the radial direction denote the directions of the rotary shaft 24a. One and the other circumferential directions respectively denote opposite one and the other rotational directions of the rotary shaft 24a about its axis.

The first end portion 24e of the rotary shaft 24a is connected to a first bladed wheel 25 that serves as the operating part of the present disclosure. The first bladed wheel 25 is disposed closer to the first end portion 24e than to the third supporting portion 24d of the rotary shaft 24a. The first bladed wheel 25 is accommodated in the first bladed wheel chamber 13b. The second end portion 24f of the rotary shaft 24a is connected to a second bladed wheel 26. The second bladed wheel 26 is disposed closer to the second end portion 24f than to the second supporting portion 24c of the rotary shaft 24a. The second bladed wheel 26 is accommodated in the second bladed wheel chamber 14b. The first bladed wheel 25, the second bladed wheel 26, and the rotating member 24 are accommodated in the housing 11.

A first sealing member 27 is disposed between the shaft insertion hole 16a of the second plate 16 and the rotating member 24. The first sealing member 27 suppresses leak of air from the first bladed wheel chamber 13b toward the motor chamber S1. A second sealing member 28 is disposed between the shaft insertion hole 17a of the third plate 17 and the rotating member 24. The second sealing member 28 suppresses leak of air from the second bladed wheel chamber 14b toward the motor chamber S1. The first sealing member 27 and the second sealing member 28 are each a seal ring, for example.

The electric motor 18 includes a cylindrical rotor 31 and a cylindrical stator 35. The rotor 31 is fixed to the rotary shaft 24a. The stator 35 is fixed in the housing 11. The rotor 31 is disposed radially inside the stator 35 and is rotated together with the rotating member 24. The rotor 31 includes a cylindrical rotor core 31a fixed to the rotary shaft 24a and a plurality of permanent magnets, which is not illustrated, disposed in the rotor core 31a. The stator 35 surrounds the rotor 31. The stator 35 includes a stator core 35a and a coil 34. The stator core 35a has a cylindrical shape and is fixed to the inner peripheral surface 121b of the peripheral wall 12b of the motor housing 12. The coil 34 is wound around the stator core 35a. The coil 34 receives current from a battery (not illustrated) so that the rotor 31 is rotated together with the rotating member 24.

The fuel cell system 1 includes a fuel cell stack 100 as a fuel cell mounted on a vehicle, the turbo compressor 10, a supply passage L1, a discharge passage L2, and a branched passage L3. The fuel cell stack 100 includes a plurality of fuel cells. The fuel cell stack 100 is connected to the discharge chamber 13c through the supply passage L1. The fuel cell stack 100 is also connected to the suction chamber 14c through the discharge passage L2. The branched passage L3 in which an intercooler 110 is disposed branches off from the supply passage L1. The intercooler 110 cools air flowing through the branched passage L3.

When the rotating member 24 is rotated together with the rotor 31, the first bladed wheel 25 and the second bladed wheel 26 are rotated together with the rotating member 24. Air, which has been drawn through the inlet 13a, is compressed by the first bladed wheel 25 in the first bladed wheel chamber 13b, and discharged from the discharge chamber 13c through the first diffuser passage 13d. The air discharged from the discharge chamber 13c is supplied to the fuel cell stack 100 through the supply passage L1. The air supplied to the fuel cell stack 100 is used for electricity generation by the fuel cell stack 100, and the used air is then discharged as exhaust from the fuel cell stack 100 to the discharge passage L2. The exhaust from the fuel cell stack 100 is drawn into the suction chamber 14c through the discharge passage L2. The exhaust drawn into the suction chamber 14c is then discharged to the second bladed wheel chamber 14b through the second diffuser passage 14d. The exhaust discharged into the second bladed wheel chamber 14b rotates the second bladed wheel 26. The rotating member 24 is rotated by the electric motor 18 and also by the rotation of the second bladed wheel 26 by the exhaust from the fuel cell stack 100. The first bladed wheel 25 serving as the operating part of the present disclosure is rotated together with the rotating member 24 to compress and discharge air, which serves as the fluid of the present disclosure. The exhaust discharged into the second bladed wheel chamber 14b is discharged outside from the outlet 14a.

The turbo compressor 10 includes a pair of thrust foil bearings 30, 30 and a pair of radial foil bearings 40, 40. The pair of thrust foil bearings 30, 30 supports the rotary shaft 24a in the axial direction of the rotary shaft 24a such that the rotary shaft 24a is rotatable relative to the housing 11. The pair of radial foil bearings 40, 40 supports the rotary shaft 24a in a direction perpendicular to the axial direction of the rotary shaft 24a such that the rotary shaft 24a is rotatable relative to the housing 11.

One of the radial foil bearings 40, 40 is disposed in the first bearing holding portion 20, and the other of the radial foil bearings 40, 40 is disposed in the second bearing holding portion 22. In the first bearing holding portion 20, the first supporting portion 24b of the rotating member 24 is rotatably supported by the one of the radial foil bearings 40, 40. The first supporting portion 24b has an outer peripheral surface that serves as a bearing-contact surface 24g supported by the one of the radial foil bearings 40, 40 in the direction perpendicular to the axial direction of the rotary shaft 24a. In the second bearing holding portion 22, the second supporting portion 24c of the rotating member 24 is rotatably supported by the other of the radial foil bearings 40, 40. The second supporting portion 24c has an outer peripheral surface that serves as the bearing-contact surface 24g supported by the other of the radial foil bearings 40, 40 in the direction perpendicular to the axial direction of the rotary shaft 24a.

Since one and the other of the radial foil bearings 40, 40 have the same configuration, the following description will focus on the one of the radial foil bearings 40, 40, and will not elaborate the other of the radial foil bearings 40, 40.

In the following description, the rotary shaft 24a is rotated in the one rotational direction about the axis of the rotary shaft 24a when the rotating member 24 is rotated together with the rotor 31. In this embodiment, the one rotational direction about the axis of the rotary shaft 24a means the counterclockwise rotational direction of the rotary shaft 24a illustrated in in FIG. 4, and is indicated by the arrow R in FIGS. 4-7.

Figure 6:
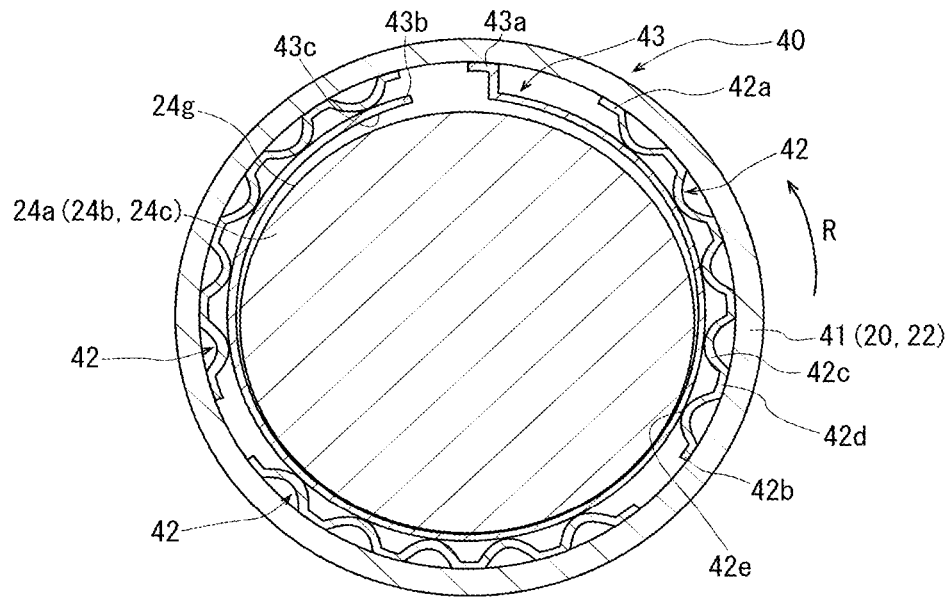
FIG. 6 is a sectional view of the turbo compressor according to the embodiment, explaining an operation of a radial foil bearing.
Figure 7:
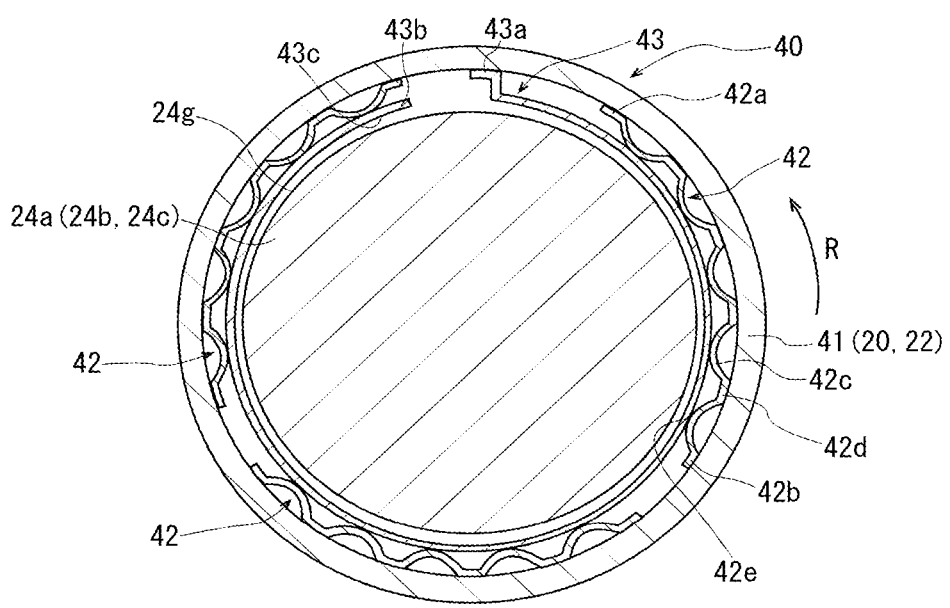
FIG. 7 is another sectional view of the turbo compressor according to the embodiment, explaining an operation of a radial foil bearing.

As illustrated in FIGS. 6 and 7, the radial foil bearing 40 includes a bearing housing 41, a bump foil 42, and a top foil 43. The first bearing holding portion 20 serves as the bearing housing 41 of the one of the radial foil bearings 40, 40, and the second bearing holding portion 22 serves as the bearing housing 41 of the other of the radial foil bearings 40, 40.

In this embodiment, three bump foils 42 are disposed in the bearing housing 41 and equally spaced from each other in the circumferential direction of the rotary shaft 24a. Since the three bump foils 42 have the same configuration, the following description will focus on one of the bump foils 42, and will not elaborate the others of the bump foils 42.

The bump foil 42 is formed of an elastic thin plate, which is made of metal, such as stainless steel, and has a predetermined approximately arc shape. The bump foil 42 has a fixed end 42a that is fixed to the bearing housing 41 by welding, and a free end 42b that is located behind the fixed end 42a in the one circumferential direction of the rotary shaft 24a. The bump foil 42 has a corrugated shape in which a plurality of projections 42c and a plurality of depressions 42d are alternatingly arranged in the circumferential direction of the rotary shaft 24a. That is, a plurality of ridges 42e of the projections 42c are arranged in the circumferential direction of the rotary shaft 24a, and includes a plurality of first ridges 421e and a plurality of second ridges 422e.

The projections 42c of the bump foil 42 are projected toward the first supporting portion 24b, in other words, toward the top foil 43, to come in contact with the top foil 43 so as to elastically support the top foil 43. The top foil 43 is elastically supported by the bump foil 42 at one of the opposite surfaces of the top foil 43, and the other surface of the top foil 43 serves as a bearing surface 43c that faces the bearing-contact surface 24g of the first supporting portion 24b in the radial direction.

Figure 4:
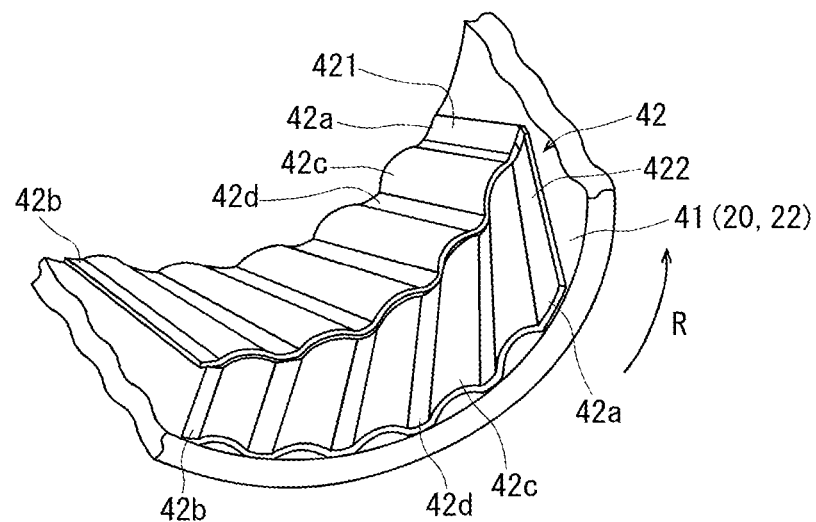
FIG. 4 is a fragmentary perspective view of the turbo compressor according to the embodiment, illustrating a bump foil and a bearing housing.
Figure 5:
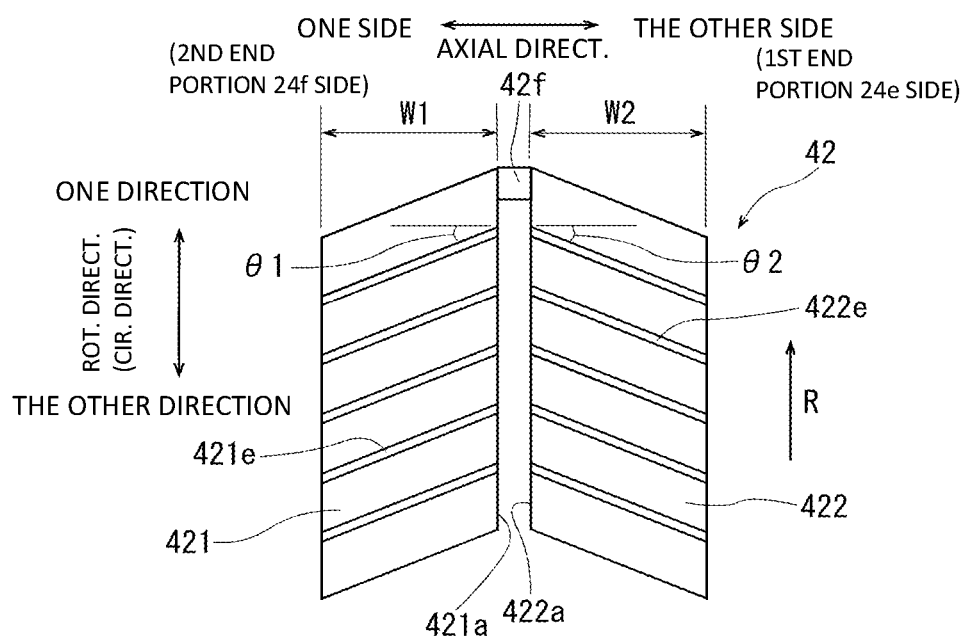
FIG. 5 is a development view of the turbo compressor according to the embodiment, illustrating a bump foil.

The bump foil 42 is divided with respect to the axial direction of the rotary shaft 24a into a first foil portion 421 and a second foil portion 422 as illustrated in FIGS. 4 and 5. The first foil portion 421 and the second foil portion 422 are arranged in the axial direction of the rotary shaft 24a. The first foil portion 421 has one end and the other end that is located behind the one end of the first foil portion 421 in the one circumferential direction. The second foil portion 422 has one end and the other end that is located behind the one end of the second foil portion 422 in the one circumferential direction. The one end of the first foil portion 421 is integrally connected to the one end of the second foil portion 422 by a connecting portion 42f. This connection with the connecting portion 42f facilitates the handling and the assembly of the first foil portion 421 and the second foil portion 422. This connection with the connecting portion 42f does not interfere with the operation and the transformation of the first foil portion 421 and the second foil portion 422. The top foil 43 is elastically supported by both of the first foil portion 421 and the second foil portion 422.

Opposite sides, i.e., one side and the other side, in the axial direction of the rotary shaft 24a in the following description correspond to the left side and the right side of FIG. 5. One side and the other side in the axial direction respectively mean a side on which the second end portion 24f of the rotary shaft 24a is located and a side on which the first end portion 24e of the rotary shaft 24a is located.

As illustrated in FIG. 5, the first foil portion 421 has the plurality of first ridges 421e, and an edge 421a, which is one of the opposite edges of the first foil portion 421 in the axial direction and located adjacent to the other side with respect to the other of the opposite edges. The first ridges 421e are inclined in the other rotational direction, in other words, the first ridges 421e are inclined rearward in the rotational direction R while extending toward the one side in the axial direction. The second foil portion 422 has the plurality of second ridges 422e, and an edge 422a, which is one of the opposite edges of the second foil portion 422 in the axial direction and located adjacent to the one side with respect to the other of the opposite edges. The second ridges 422e are inclined in the other rotational direction, in other words, the second ridges 422e are inclined rearward in the rotational direction R while extending toward the other side in the axial direction.

The first foil portion 421 and the second foil portion 422 respectively have an axial width W1 and an axial width W2 in the axial direction, and the axial width W1 is equal to the axial width W2. Each first ridge 421e of the first foil portion 421 and each second ridge 422e of the second foil portion 422 respectively form a first acute angle 81 and a second acute angle 82 with the axial direction, and the first acute angle 81 is equal to the second acute angle 82. The first acute angle 81 of the first ridge 421e of the first foil portion 421 may mean an inclined angle of the first ridge 421e at which the first ridge 421e is inclined in the other rotational direction. Similarly, the second acute angle 82 of the second ridge 422e of the second foil portion 422 may mean an inclined angle of the second ridge 422e at which the second ridge 422e is inclined in the other rotational direction.

The top foil 43 is formed of an elastic thin plate made of metal, such as stainless steel, and has a predetermined approximately cylindrical shape. The top foil 43 has opposite ends in the circumferential direction of the rotary shaft 24a, and one end of the opposite ends is folded outwardly in the radial direction and fixed to the bearing housing 41 by welding. That is, the one end of the top foil 43 is a fixed end 43a, and the other end of the top foil 43, which is located behind the one end of the top foil 43 in the one circumferential direction of the rotary shaft 24a, is a free end 43b.

The pair of thrust foil bearings 30, 30 is disposed in the thrust bearing accommodation chamber S2. The thrust foil bearings 30, 30 hold therebetween the third supporting portion 24d as a thrust collar. The thrust foil bearings 30, 30 face the third supporting portion 24d in the axial direction of the rotary shaft 24a. One of the thrust foil bearings 30, 30 is located adjacent to the first end portion 24e of the rotary shaft 24a with respect to the third supporting portion 24d. The other of the thrust foil bearings 30, 30 is located adjacent to the second end portion 24f of the rotary shaft 24a with respect to the third supporting portion 24d.

The opposite end faces of the third supporting portion 24d serve as thrust bearing-contact surfaces 241d, 241d. One of the thrust bearing-contact surfaces 241d, 241d adjacent to the first end portion 24e of the rotary shaft 24a is axially supported by the one of the thrust foil bearings 30, 30 (see FIG. 2). The other of the thrust bearing-contact surfaces 241d, 241d adjacent to the second end portion 24f of the rotary shaft 24a is axially supported by the other of the thrust foil bearings 30, 30.

Since one and the other of the thrust foil bearings 30, 30 have the same configuration, the following description will focus on the one of the thrust foil bearings 30, 30, and will not elaborate the other of the thrust foil beatings 30, 30.

The thrust foil bearing 30 includes a thrust bearing housing, six thrust bump foils 32 attached to the thrust bearing housing, and six thrust top foils 33 attached to the thrust bearing housing and located at positions respectively corresponding to the thrust bump foils 32. Each of the thrust bump foils 32 and each of the thrust top foils 33 have an approximately fan-like outline in a plane view. The thrust bump foils 32 and the thrust top foils 33 are each formed of an elastic thin plate made of metal, such as stainless steel, and has a predetermined shape.

The thrust bearing housing is formed of a part of the second plate 16. That is, the thrust bearing housing is formed of the end face 16*b* of the second plate 16 at a part of the end face 16*b* that defines the thrust bearing accommodation chamber S2. The thrust bearing housing faces the third supporting portion 24*d* in the axial direction of the rotary shaft 24*a*. The thrust bearing housing has an insertion hole through which the rotary shaft 24*a* is inserted. Additionally, the other of the thrust foil bearings 30, 30 includes a thrust bearing housing that is formed of the recess 15*c* of the first plate 15 that defines the thrust bearing accommodation chamber S2.

In this embodiment, the six thrust bump foils 32 are attached on an end face of the thrust bearing housing adjacent to the third supporting portion 24*d*, and equally spaced from each other around the insertion hole in the circumferential direction of the rotary shaft 24*a*. Each of the thrust bump foils 32 has opposite ends in the circumferential direction, and one end of the opposite ends is fixed to the thrust bearing housing by welding. That is, the one end is a fixed end, and the other end of the thrust bump foil 32, which is located behind the one end of the opposite ends in the one circumferential direction, is a free end. Reversely, the one end and the other end of the thrust bump foil 32 may be respectively a free end and a fixed end.

The thrust bump foil 32 has a corrugated shape in which a plurality of projections and a plurality of depressions are alternatingly arranged in the circumferential direction of the rotary shaft 24*a*. That is, a plurality of ridges of the projections are arranged in the circumferential direction of the rotary shaft 24*a*. The projections are projected toward the third supporting portion 24*d* to come in contact with the thrust top foil 33 so as to elastically support the thrust top foil 33. The thrust top foil 33 is elastically supported by the thrust bump foil 32 at one of the opposite surfaces of the thrust top foil 33, and the other surface of the thrust top foil 33 serves as a thrust bearing surface 33*c* that faces the thrust bearing-contact surface 241*d* of the third supporting portion 24*d* in the axial direction (see FIG. 2).

In this embodiment, the six thrust top foils 33 are attached on the end face of the thrust bearing housing adjacent to the third supporting portion 24*d*, and the thrust top foils 33 are disposed alongside around the insertion hole and equally spaced from each other in the circumferential direction of the rotary shaft 24*a* so as to respectively correspond to the thrust bump foils 32. Each thrust top foil 33 has opposite ends in the circumferential direction, and one end of the opposite ends is located in front of the other end of the opposite ends in the one circumferential direction of the rotary shaft 24*a*. The other end of the opposite ends is folded toward the thrust bearing housing and fixed to the thrust bearing housing at the distal portion of the other end by welding. That is, the one end and the other end of the thrust top foil 33 are a free end and a fixed end, respectively.

As illustrated in FIG. 6, the radial foil bearings 40, 40 support the rotary shaft 24*a* with the bearing surfaces 43*c* of the top foils 43 respectively in contact with the bearing-contact surface 24*g* of the first supporting portion 24*b* and the bearing-contact surface 24*g* of the second supporting portion 24*c* until the rotational speed of the rotary shaft 24*a* reaches a floating rotational speed at which the first supporting portion 24*b* and the second supporting portion 24*c* of the rotary shaft 24*a* float off the radial foil bearings 40, 40.

As illustrated in FIG. 7, when the rotational speed of the rotary shaft 24*a* reaches the floating rotational speed, a pressure of the fluid film generated between the top foil 43 and the first and second supporting portions 24*b*, 24*c* causes the top foil 43 to elastically deform with elastic deformation of the bump foil 42, thereby causing the first and second supporting portions 24*b*, 24*c* to float off the radial foil bearings 40, 40. Accordingly, the radial foil beatings 40, 40 support the rotary shaft 24*a* without contacting the first supporting portion 24*b* and the second supporting portion 24*c*.

The thrust foil bearings 30, 30 support the rotary shaft 24*a* with the thrust bearing surface 33*c* of the thrust top foil 33 in contact with the thrust bearing-contact surface 241*d* of the third supporting portion 24*d* until the rotational speed of the rotary shaft 24*a* reaches a floating rotational speed at which the third supporting portion 24*d* floats off the thrust foil bearings 30, 30. When the rotational speed of the rotary shaft 24*a* reaches the floating rotational speed, a pressure of the fluid film generated between the thrust top foil 33 and the third supporting portion 24*d* causes the third supporting portion 24*d* to float off the thrust foil bearings 30, 30. Accordingly, the thrust foil bearings 30, 30 support the rotary shaft 24*a* without contacting the third supporting portion 24*d*.

As illustrated in FIGS. 1-3, the housing 11 has a cooling passage 50. Air serving as the fluid of the present disclosure flows through the cooling passage 50. The cooling passage 50 is formed through the second plate 16, the first plate 15, the motor housing 12, and the third plate 17. The cooling passage 50 includes a first passage 51 and a second passage 52.

The first passage 51 is formed in the second plate 16. The first passage 51 has an inlet 51*a* formed in a side wall surface of the second plate 16. The inlet 51*a* of the first passage 51 is connected to the supply passage L1 through the branched passage L3. The first passage 51 is communicated with the motor chamber S1 through the thrust bearing accommodation chamber S2 and the one of the radial foil bearings 40, 40.

The second passage 52 is formed in the third plate 17. The second passage 52 has an outlet 52*a* formed in a side surface of the third plate 17. The second passage 52 is communicated with the motor chamber S1 through the other of the radial foil bearings 40, 40.

The air flowed through the supply passage L1 toward the fuel cell stack 100 partly flows into the first passage 51 through the branched passage L3. The air in the first passage 51 has been cooled by the intercooler 110 while flowing through the branched passage L3. The cooled air in the first passage 51 flows into the thrust bearing accommodation chamber S2.

The cooled air in the thrust bearing accommodation chamber S2 flows outwardly from the inner peripheral side mainly through the one of the thrust foil bearings 30, 30. Specifically, the cooled air flows outwardly from the inner peripheral side of the thrust top foil 33 through a gap between the thrust top foil 33 and the thrust bearing housing of the one of the thrust foil bearings 30, 30. The cooled air flows radially outside of the third supporting portion 24d as a thrust collar, and flows inwardly from the outer peripheral side mainly through the other of the thrust foil bearings 30, 30. Specifically, the cooled air flows inwardly from the outer peripheral side of the thrust top foil 33 through a gap between the thrust top foil 33 and the thrust bearing housing of the other of the thrust foil bearings 30, 30.

The cooled air flows through the thrust bearing accommodation chamber S2 and then flows into the motor chamber S1 through the one of the radial foil bearings 40, 40. Specifically, the cooled air flows from the first end portion 24e side of the rotary shaft 24a toward the second end portion 24f side of the rotary shaft 24a in the axial direction, through a gap between the top foil 43 and the bearing housing 41 of the one of the radial foil bearings 40, 40. The cooled air flows through the one of the radial foil bearings 40, 40 and flows into the motor chamber S1.

The air in the motor chamber S1, for example, flows through a gap between the rotor 31 and the stator 35, and the air then flows into the second passage 52 through the other of the radial foil bearings 40, 40 and is discharged from the outlet 52a.

Accordingly, the cooled air flows through the cooling passage 50 so as to directly cool the electric motor 18, the pair of thrust foil bearings 30, 30, and the pair of radial foil bearings 40, 40.

In this turbo compressor 10, the bump foil 42 of each radial foil bearing 40 is divided into the first foil portion 421 on the one side and the second foil portion 422 on the other side in the axial direction of the rotary shaft 24a, and an inclined angle of the ridge 42e of each projection 42c of the corrugated shape is different between the first foil portion 421 and the second foil portion 422. Specifically, the first ridges 421e on the first foil portion 421 are inclined in the other rotational direction while extending from the edge 421a adjacent to the other side toward the one side in the axial direction. The second ridges 422e on the second foil portion 422 are inclined in the other rotational direction while extending from the edge 422a adjacent to the one side toward the other side in the axial direction. That is, the first ridges 421e on the first foil portion 421 are inclined rearward in the rotational direction R while extending from the other side toward the one side in the axial direction. In contrast, the second ridges 422e on the second foil portion 422 are inclined rearward in the rotational direction R while extending from the one side toward the other side in the axial direction.

In this configuration, when the rotation of the rotary shaft 24a at a high rotational speed equal to or faster than the floating rotational speed causes the corrugated shape of the bump foil 42 to be transferred to the top foil 43, so that the top foil 43 has a herringbone shape such that the peak of each V-shape formed by ridges of projections on the top foil 43 is oriented frontward in the one rotational direction, i.e., in the rotational direction R. In the bearing gap between the bearing surface 43c of the top foil 43 of the one of the radial foil bearings 40, 40 and the bearing-contact surface 24g of the first supporting portion 24b and the bearing gap between the bearing surface 43c of the top foil 43 of the other of the radial foil bearings 40, 40 and the bearing-contact surface 24g of the second supporting portion 24c of the rotary shaft 24a, this herringbone configuration allows the fluid to be guided by each ridge toward the peak of the V-shape, in other words, toward the center of the top foil 43 from the opposite ends of the top foil 43 in the axial direction. This configuration therefore suppresses a leak of the fluid compressed in the bearing gap from the opposite sides in the axial direction, thereby suppressing a decrease in the pressure of the fluid film in the bearing gap.

In contrast, the radial foil bearing 40 is likely to be heated by sliding of the rotary shaft 24a on the top foil 43 at low speed rotation of the rotary shaft 24a because the rotary shaft 24a is supported by the top foil 43 with the rotary shaft 24a in contact with the top foil 43. Since both of the bearing surface 43c and the bearing-contact surface 24g are not provided with a groove, area of contact between the bearing surface 43c and the bearing-contact surface 24g is not reduced by the presence of a groove at a low rotation speed of the rotary shaft 24a at which the rotary shaft 24a rotates at a rotational speed lower than the floating rotational speed such that the bearing-contact surface 24g slides on the bearing surface 43c. This prevents a decrease in the durability of the top foil 43 by wear or burn-in.

Accordingly, the turbo compressor 10 is capable of suppressing a decrease in the pressure of the fluid film on the radial foil bearing 40 so as to suppress a decrease in a load capacity of the radial foil bearing 40 without causing a decrease in the durability of the top foil 43.

The radial foil bearing 40 may have a problem on a heat resistance of the top foil 43. At high speed rotation of the rotary shaft 24a, the top foil 43 is likely to be heated by shearing of a fluid film between the rotary shaft 24a and the top foil 43. The top foil 43 is formed of an elastic thin plate having a low heat capacity. Accordingly, the top foil 43 is likely to have high temperature. In this regard, the cooled air flows through the gap between the bearing housing 41 and the top foil 43 in the turbo compressor 10 so as to cool the top foil 43. This alleviates the problem on the heat resistance of the top foil 43.

Similarly, the cooled air flows through the gap between the thrust bearing housing and the thrust top foil 33 of each thrust foil bearing 30 so as to cool the thrust top foil 33. This alleviates the problem on the heat resistance of the thrust top foil 33.

If the first passage 51 and the second passage 52 of the cooling passage 50 are formed such that the cooled air flows through the gap between the bearing housing 41 and the top foil 43 of the radial foil bearing 40, the fluid from ends of the bearing gap flows outside the motor chamber S1 or the turbo compressor 10 through the first passage 51 or the second passage 52 together with the cooled air. The fluid leak from the ends of the bearing gap directly leads to a decrease in the pressure of the fluid film. Accordingly, it is more important to suppress the fluid leak from the ends of the bearing gap. In this regard, the turbo compressor 10 suppresses the fluid leak from the ends of the bearing gap by the presence of the ridges of the projections on the top foil 43, so that this configuration exhibits this advantageous effects of fluid leak suppression notably if the first passage 51 and the second passage 52 of the cooling passage 50 are formed in the above-described manner.

The following will describe modification examples 1 and 2 in which the bump foil 42 of the radial foil bearing 40 of the turbo compressor 10 is modified.

Modification Example 1 of Bump Foil

Figure 8:
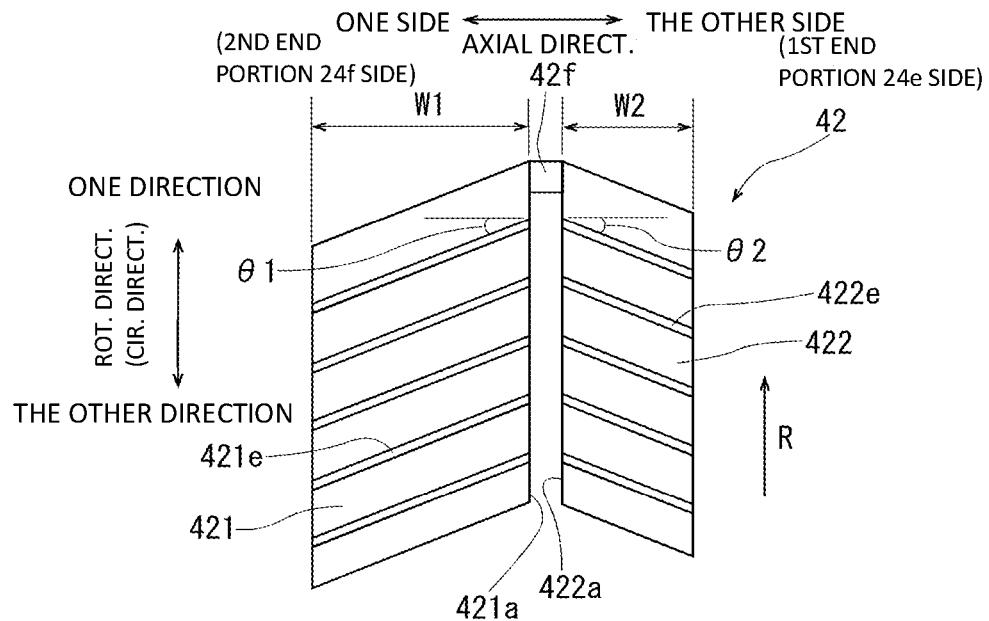
FIG. 8 is a development view of the turbo compressor according to the embodiment, illustrating a bump foil according to the modification example 1.

As illustrated in FIG. 8, according to the modification example 1, the first foil portion 421 and the second foil portion 422 of the bump foil 42 respectively have the axial width W1 and the axial width W2 in the axial direction, and the axial width W1 is greater than the axial width W2. The first acute angle 81 of the first ridge 421e of the first foil portion 421 is equal to the second acute angle 82 of the second ridge 422e of the second foil portion 422.

The first passage 51 and the second passage 52 of the cooling passage 50 are formed such that the cooled air flows from the other side toward the one side in the axial direction in the bump foil 42. In this case, an ambient pressure P1 of the top foil 43 on the one side is lower than an ambient pressure P2 of the top foil 43 on the other side. This ambient pressure relationship causes the fluid leak from the bearing gap of the top foil 43 on the one side to be larger than that from the bearing gap of the top foil 43 on the other side.

In the top foil 43 of the modification example 1, the axial width W1 of the first foil portion 421 on the one side is greater than the axial width W2 of the second foil portion 422 on the other side. This configuration increases the force that gathers the fluid, which may leak from the end on the one side, into the center of the bearing gap, thereby suppressing the fluid leak from the end of the bearing gap on the one side effectively.

Modification Example 2 of Bump Foil

Figure 9:
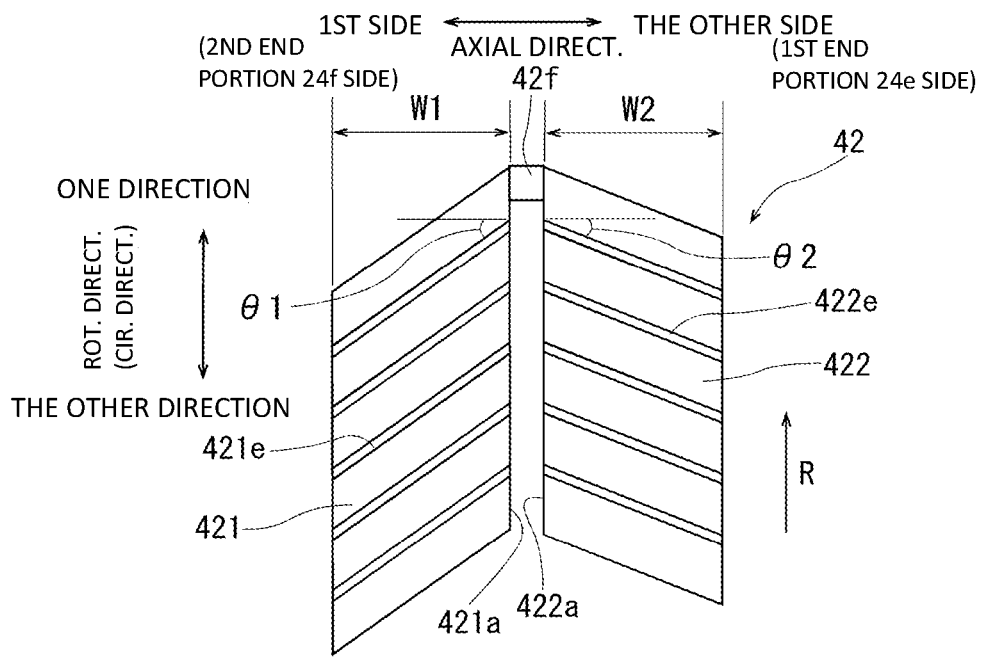
FIG. 9 is a development view of the turbo compressor according to the embodiment, illustrating a bump foil according to the modification example 2.

As illustrated in FIG. 9, in the bump foil 42 according to the modification example 2, the first acute angle 81 of the first ridge 421e of the first foil portion 421 is greater than the second acute angle 82 of the second ridge 422e of the second foil portion 422. In the bump foil 42 according to the modification example 2, the axial width W1 of the first foil portion 421 is equal to the axial width W2 of the second foil portion 422.

The first passage 51 and the second passage 52 of the cooling passage 50 are formed such that the cooled air flows from the other side toward the one side in the axial direction in the bump foil 42. In this case, an ambient pressure P1 of the top foil 43 on the one side is lower than an ambient pressure P2 of the top foil 43 on the other side. This ambient pressure relationship causes the fluid leak from the bearing gap of the top foil 43 on the one side is larger than on the other side.

In the top foil 43 of the modification example 2, the first acute angle 81 of the first ridge 421e of the first foil portion 421 on the one side is greater than the second acute angle 82 of the second ridge 422e of the second foil portion 422 on the other side. This configuration increases the force that gathers the fluid, which may leak from the end on the one side, into the center of the bearing gap, thereby suppressing the fluid leak from the end of the bearing gap on the one side effectively.

Although the present disclosure has been described based on the above embodiment, the present disclosure is not limited to the above embodiment, and may be modified within the scope of the present disclosure.

Although each radial foil bearing 40 according to the embodiment includes the three bump foils 42 equally spaced from each other about the axis of the rotary shaft 24a, the number of the bump foils 42 is not limited to three. The number of the bump foils 42 may be two, or may be four or more. Alternatively, each radial foil bearing 40 may include a single bump foil extending over approximately the whole circumferential direction.

In each radial foil bearing 40 according to the embodiment, the first foil portion 421 is connected to the second foil portion 422 by the connecting portion 42f. However, the first foil portion 421 may not be connected to the second foil portion 422.

According to the embodiment, the housing 11 includes the first plate 15 and the motor housing 12. The first plate 15 includes the first bearing holding portion 20 that serves as the bearing housing 41 of the one of the radial foil bearings 40, 40. The motor housing 12 includes the second bearing holding portion 22 that serves as the bearing housing 41 of the other of the radial foil bearings 40, 40. However, the configuration of the bearing housing 41 of each radial foil bearing 40 is not limited thereto. The bearing housing 41 of each radial foil bearing 40 may be formed of a member that is not a member of the housing 11.

In each radial foil bearing 40 according to the embodiment, the bump foil 42 is divided into two portions such as the first foil portion 421 and the second foil portion 422 with respect to the axial direction, however, the configuration of the bump foil 42 is not limited thereto. The bump foil 42 may be divided into three or more portions with respect to the axial direction, and a third foil portion and/or fourth foil portion, which have an axial width W and an acute angle θ set as necessary, may be disposed between the first foil portion 421 and the second foil portion 422.

According to the embodiment, the cooling passage 50 is formed such that the cooled fluid flows through the gap between the bearing housing 41 and the top foil 43 from the other side toward the one side in the axial direction. However, the cooling passage 50 may be formed such that the cooled fluid flows through the gap between the bearing housing 41 and the top foil 43 from the one side toward the other side in the axial direction.

The present disclosure is applicable to an air compressor or the like for fuel cell system.

What is claimed is:

1. A turbo fluid machine comprising:
   a rotary shaft configured to rotate in one rotational direction about an axis of the rotary shaft;
   an operating part configured to rotate together with the rotary shaft to compress and discharge a fluid;
   a housing accommodating the rotary shaft and the operating part; and
   a radial foil bearing supporting the rotary shaft such that the rotary shaft is rotatable relative to the housing, wherein
   the radial foil bearing includes:
      a top foil formed of an elastic thin plate and having a bearing surface that faces a peripheral surface of the rotary shaft;
      a bump foil formed of an elastic thin plate having a corrugated shape in which ridges of projections projected toward the top foil are arranged in a circumferential direction of the rotary shaft, the bump foil elastically supporting the top foil; and
      a bearing housing supporting the bump foil,
   the bump foil is divided into a first foil portion and a second foil portion arranged respectively on one side and on the other side in an axial direction of the rotary shaft,
   the top foil is elastically supported by both of the first foil portion and the second foil portion,
   the ridges on the first foil portion are inclined in the other rotational direction of the rotary shaft while extending from an edge of the first foil portion adjacent to the other side toward the one side in the axial direction, and
   the ridges on the second foil portion are inclined in the other rotational direction of the rotary shaft while extending from an edge of the second foil portion adjacent to the one side toward the other side in the axial direction.

2. The turbo fluid machine according to claim 1, wherein
the housing has a cooling passage through which a cooled fluid for cooling the radial foil bearing flows, and
the cooling passage is formed such that the cooled fluid flows through a gap between the bearing housing and the top foil from the one side toward the other side in the axial direction or such that the cooled fluid flows through the gap between the bearing housing and the top foil from the other side toward the one side in the axial direction.

3. The turbo fluid machine according to claim 2, wherein
the cooling passage is formed such that the cooled fluid flows from the other side toward the one side in the axial direction, and
an axial width of the first foil portion is greater than an axial width of the second foil portion in the axial direction.

4. The turbo fluid machine according to claim 2, wherein
the cooling passage is formed such that the cooled fluid flows from the other side toward the one side in the axial direction, and
each of the ridges of the first foil portion and each of the ridges of the second foil portion respectively form a first acute angle and a second acute angle with the axial direction, and the first acute angle is greater than the second acute angle.

\* \* \* \* \*